(12) United States Patent
Peck

(10) Patent No.: US 6,561,103 B2
(45) Date of Patent: May 13, 2003

(54) PALLET CONVEYOR SYSTEM

(75) Inventor: Glen Peck, Grand Blanc, MI (US)

(73) Assignee: Peck Assembly Systems, Inc., Grand Blanc, MI (US)

( * ) Notice: Subject to any disclaimer, the term of this patent is extended or adjusted under 35 U.S.C. 154(b) by 40 days.

(21) Appl. No.: 09/946,307

(22) Filed: Sep. 5, 2001

(65) Prior Publication Data

US 2003/0041770 A1 Mar. 6, 2003

(51) Int. Cl.$^7$ ............................................. B61C 11/00
(52) U.S. Cl. ...................... 105/29.1; 104/249; 104/250; 104/88.06
(58) Field of Search ............................. 105/29.1, 29.2, 105/148, 150; 104/242, 243, 245, 247, 249, 250, 89, 93, 88.01, 88.02, 88.03, 88.04, 88.06; 191/10; 198/463.1, 465.1, 465.2, 465.3, 464.1

(56) References Cited

U.S. PATENT DOCUMENTS

| | | | | |
|---|---|---|---|---|
| 4,207,821 A | * | 6/1980 | Beckert | 104/119 |
| 4,823,704 A | * | 4/1989 | Fujita et al. | 104/247 |
| 4,944,230 A | * | 7/1990 | Maeda et al. | 104/139 |
| 4,951,574 A | | 8/1990 | Tsuneda | 104/295 |
| 4,987,834 A | | 1/1991 | Peck et al. | 104/300 |
| 5,388,684 A | | 2/1995 | Peck | 198/465.1 |

FOREIGN PATENT DOCUMENTS

DE    4189    5/1901

* cited by examiner

*Primary Examiner*—Mark T. Le
(74) *Attorney, Agent, or Firm*—Gifford, Krass, Groh, Sprinkle, Anderson & Citowski, P.C.

(57) ABSTRACT

A pallet conveyor system includes a rail assembly and a pallet assembly. The rail assembly including parallel and spaced-apart rail supports that each has a cylindrical rail disposed thereon. An intermediate support is positioned between the rails and includes a removable stop bar. The pallet assembly engages the rails and is adapted for forward or reverse motion along the rails. A first and second sensor are secured to the pallet assembly and adapted to detect the stop bar as the pallet moves along the rails. When the first sensor detects the stop bar, the pallet assembly is slowed. Thereafter, as the second sensor detects the stop bar, the pallet assembly is stopped. Therefore, by simple movement of the stop bar, a pallet assembly may be easily and precisely positioned at any location along, a conveyor line without the need to reprogram the pallet assembly.

14 Claims, 6 Drawing Sheets

PALLET CONVEYOR SYSTEM

BACKGROUND OF THE INVENTION

1. Field of the Invention

The present invention is directed to a conveyor system. More particularly, this invention concerns a pallet conveyor system in which individual pallets are independently conveyed along a fixed track or way to and from one or more workstations.

2. Reference to Related Art

The use of conveyor systems for transporting workpieces to and from workstations is known in the art. Indeed, a wide variety of conveyor designs have been developed or adapted for use in connection with the automatic transport of workpieces during manufacturing operations. One particular category of these conveyor systems utilizes a system of pallets that are driven along a track. Typically, in systems of this type, a workpiece is supported on a pallet that is then propelled into and out of at least one workstation.

One reference relevant to this category of conveyor systems is U.S. Pat. No. 4,388,684 to Peck. The '684 reference discloses a pallet conveyor that includes a longitudinally extending pallet that is supported upon a track. A plurality of rotary drives are spaced along the track and engage the pallet to transport the pallet along the track.

U.S. Pat. No. 4,987,834 issued to Peck, Jr. et al. also discloses a conveyor with self-propelled pallets. More particularly, the '834 reference discloses a conveyor system that includes a plurality of pallets supported upon a track. Each of the pallets includes a drive motor and a control system capable of queuing the pallets into position.

While these and other prior art pallet systems permit transport of a pallet carrying a workpiece along a track, the precise alignment of the workpiece in the workstation remains problematic. Indeed, while the '834 reference discloses the use of a plurality of pallets along the track, each pallet must be clamped into position at the workstation before workstation operations may begin. Furthermore, problems with pallet precision as well as pallet speed necessarily increase as the weight of the workpiece increases.

Therefore, there is a need in the art for a pallet conveyor system having a drive means that permits highly accurate and reproducible placement of a workpiece at a workstation and is capable of transporting all manner of workpieces without a resulting decrease in performance. Additionally, the conveyor system should include means for safe operation of the conveyor system and the capability to easily and effectively communicate with and control individual pallets in the system.

SUMMARY OF THE INVENTION

A pallet conveyor system of the present invention includes a rail assembly and a pallet assembly. The rail assembly preferably includes a pair of spaced apart and parallel conveyor supports, each of the conveyor supports having a support rail mounted thereon. The rail supports each include a cylindrical rail that functions as a track or way for the pallet assembly. Preferably, at least one of the rail supports includes a number of parallel transmission bars that are used to transmit electrical power to the pallet assembly. An intermediate support is preferably positioned between the rails and includes on one side a rack and, on an opposite side, a removable and repositionable stop bar. A data coupler is preferably secured to at least one of said rail supports and is adapted to communicate with and provide any necessary command instructions to the pallet assembly. Command instructions are preferably provided while the pallet assembly is stopped at a workstation. However, it should be appreciated that commands may also be transmitted to the pallet assembly through the data coupler while the pallet is moving along the track. Alternatively, commanding instructions may be transmitted to the pallet assembly through the transmission bars or through radio or another manner of transmission that is known in the art.

The pallet assembly includes a body having a longitudinal extending frame and a base. Preferably, the pallet is supported on the rails of the rail assembly by a plurality of roller bearings. A drive system for the pallet assembly, that permits both forward and reverse motion for the pallet, engages the rack of the rail assembly to propel the pallet assembly along the rails. A trolley assembly is secured to the frame of the body and includes a housing and a number of brushes that are biased to contact the transmission bars.

Cueing of the pallet assembly into a workstation is preferably controlled by use of a pair of sensors. Specifically, a first sensor and second sensor are secured to the pallet assembly and are positioned to detect the stop bar as the pallet moves along the rails. As the first sensor detects the stop bar, the pallet assembly is slowed. Thereafter, as the second sensor detects the stop bar, the pallet assembly is stopped. Therefore, it should be apparent that a mere repositioning of the stop bar will result in the pallet assembly being easily and precisely stopped at any location along a conveyor line without the need to reprogram the pallet assembly. Preferably, the pallet assembly is restated along the rails by the transmission through the data coupler (or the like) of a start signal. Preferably, the start signal is manually activated by the user, as the user is clear of the conveyor system.

BRIEF DESCRIPTION OF THE DRAWING

A preferred embodiment of the invention is illustrated in the drawings in which.

DETAILED DESCRIPTION OF THE PREFERRED EMBODIMENT

Figure 1:
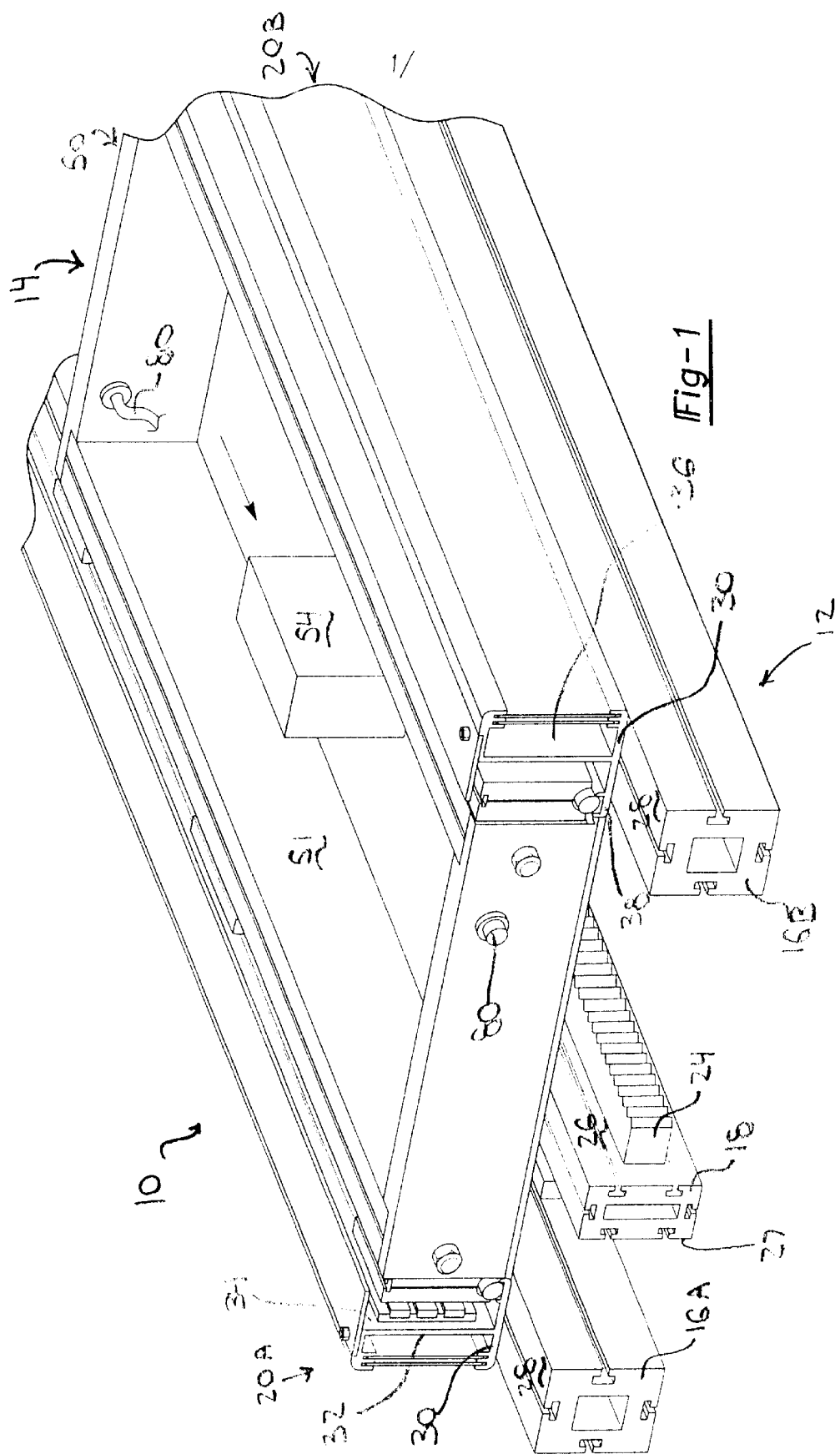
FIG. 1 is a perspective view of the pallet system constructed in accordance with the present invention.
Figure 8:
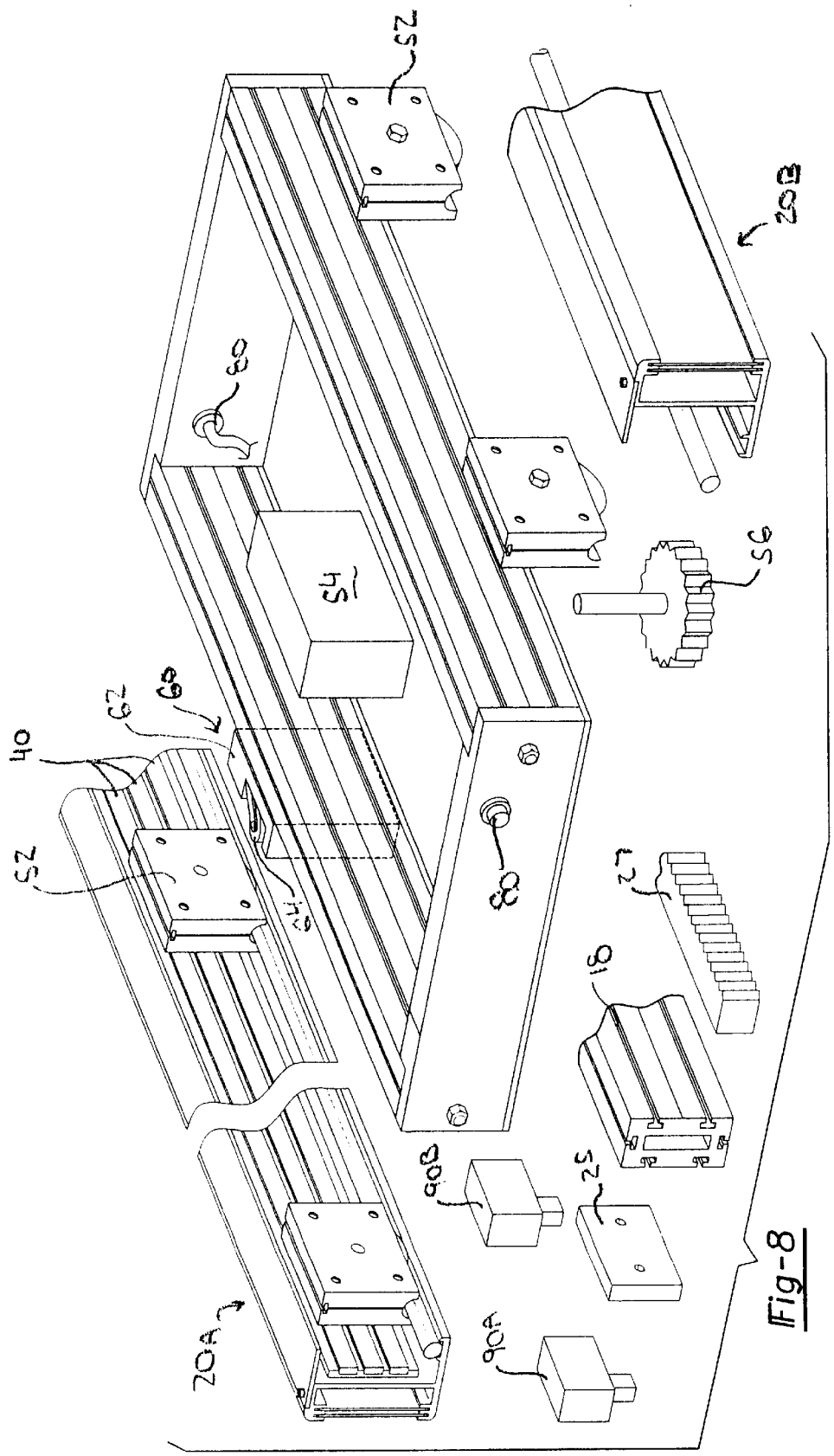
FIG. 8 is an exploded perspective view of the pallet system constructed in accordance with the present invention.

Referring now to FIGS. 1–8, and particularly to FIGS. 1 and 8, there is shown a preferred embodiment of a pallet conveyor system 10 constructed in accordance with the present invention. The pallet conveyor system 10 includes a rail assembly 12 and a pallet assembly 14 adapted to carry a workpiece (not shown). Preferably, the rail assembly 12 has at least two conveyor supports 16A, 16B, an intermediate support 18 and a pair of rail supports 20A, 20B upon which are disposed cylindrical rails 22A, 22B. The pallet assembly 14 engages the rails 22A, 22B of the rail assembly 20A. 20B to enable movement of manufactured goods down the conveyor line.

Figure 2:
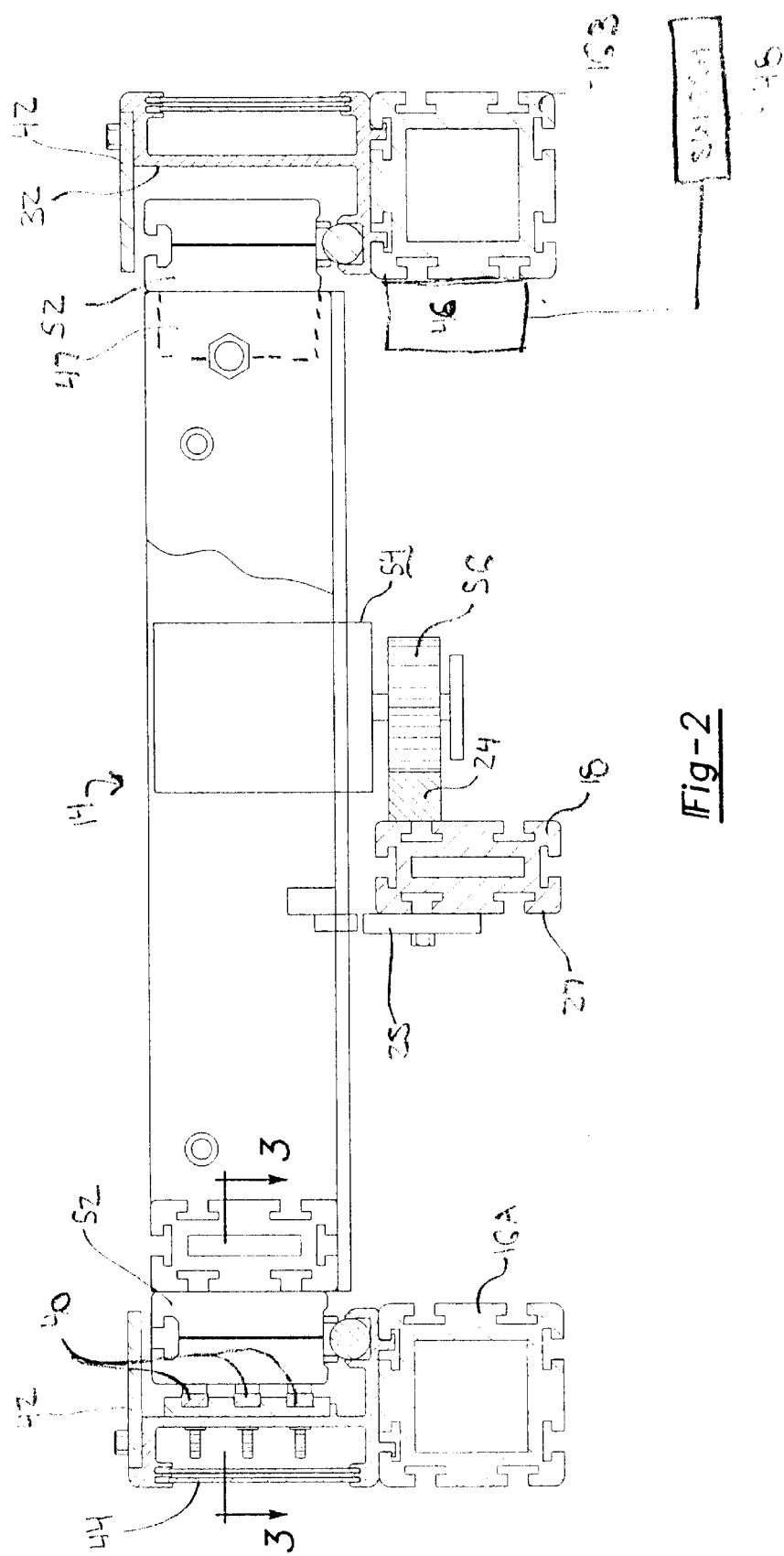
FIG. 2 is a planar end view of the pallet system of the present invention.

Referring now to FIGS. 1, 2 and 8, there is shown a rail assembly 12 for use in connection with the pallet system 10 of the present invention. Preferably, the rail assembly 14 includes at least two spaced-apart conveyor supports 16A, 16B. In order to maximize strength and minimize weight, the conveyor supports 16A, 16B are preferably constructed of extruded aluminum. However, it will be appreciated that other structural material such as steel, aluminum alloy and other alloys or material will also function as conveyor supports 16A, 16B so long as the material maintains sufficient strength to support the pallet conveyor system 10 of the present invention.

An intermediate support 18 is preferably disposed in a parallel relationship between the conveyor supports 16A, 16B. The intermediate support 18 is preferably constructed of the same materials used to construct the conveyor supports 16A, 16B. A rack 24, which is engaged by the pallet assembly 14 of the present invention, as described below, is preferably affixed to a side 26 of the intermediate support 18 facing one of the conveyor supports 16A, 16B. Additionally, a stop bar 25 is preferably removably affixed to a side 27 of the intermediate support 18 that is opposite the rack 24. Use of the stop bar 25 in the operation of the present invention will also be described below in detail.

Still referring to FIGS. 1, 2 and 8, rail supports 20A, 20B are preferably mounted on the upper surfaces 28 of each conveyor support 16A, 16B. Preferably, the rail supports 20A, 20B include a base 30 that is affixed to a conveyor support 16A, 16B and a wall 32 that extends upwardly from the base 30 to divide the rail support 20A, 20B into interior 34 and exterior 36 sections. A channel 38 is disposed in the base 30 on the interior 34 side of the rail supports 20A, 20B into which is placed a cylindrical rail 22A, 22B. The cylindrical rail 22A, 22B functions as a track for the pallet assembly 14 as will be discussed in detail below.

Preferably, the rail supports 22A, 22B are arrayed as mirror images of each other on the conveyor supports 16A, 16B. However, a plurality of transmission bars 40 are disposed on the interior side of the wall 32 of at least one rail support 20A, 20B. The transmission bars 40 are preferably copper strips that function to communicate power, data, or a combination thereof, to the pallet assembly 14. It should be appreciated that the transmission bars 40 may alternatively be disposed along the walls 32 of both rail supports 20A, 20B. Each rail support 20A, 20B includes a cover 42 that is removably affixed to the top of the rail support 22A, 22B and a panel 44 that slidably engages grooves 45 that are provided in the exterior 36 side of the rail support 22A, 22B. Preferably, the cover 42 and panel 44 function to conceal the rails as well as any cabling (not shown) used in connection with the pallet conveyor system 10 of the present invention.

A data coupler 46 having an infrared transmitter is preferably affixed to the inside of at least one conveyor support 16A, 16B in a location where it is capable of communicating with an infrared data coupler 47 of the pallet assembly while, as discussed below, the pallet assembly is in a stop position at a workstation. Preferably, the data coupler 46 is an electronic communication with a switch 48 and command station (not shown) that permits an operator to manually restart progress of the pallet assembly down the conveyor line or transmit command instructions to the pallet assembly 14 while it is at a workstation.

Figure 4:
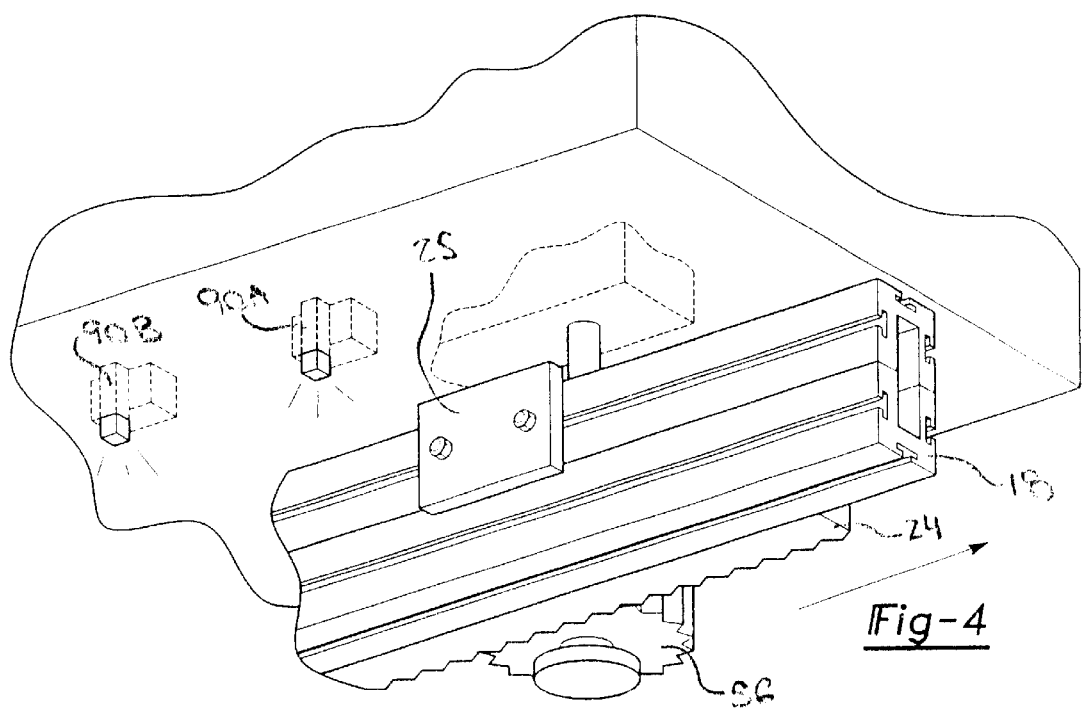
FIG. 4 is a partial perspective view of the underside of the pallet of the present invention as it engages the rack.

Referring now to FIGS. 1, 2 and 5–8, there is shown a pallet assembly 14 constructed in accordance with the present invention. Preferably, the pallet assembly 14 includes a body 50 having a longitudinally extending pallet frame 51 that is constructed of extruded aluminum or a similar type material. Roller bearings 52 are preferably disposed on the exterior of the frame 51 in or near the corners and engage the cylindrical rails 22A, 22B of the rail supports 20A, 20B. Preferably, the pallet assembly 14 includes a drive system 54 that is constructed of materials known in the art, including a programmable memory (e.g., an I/O board), a servo motor, a gear reducer and a voltage clamp (none shown). As best shown in FIG. 4, a spur gear 56 of the drive system 54 preferably extends through a base 58 or floor of the pallet assembly 14 to engage the rack 24 of the intermediate support 18.

Figure 3:
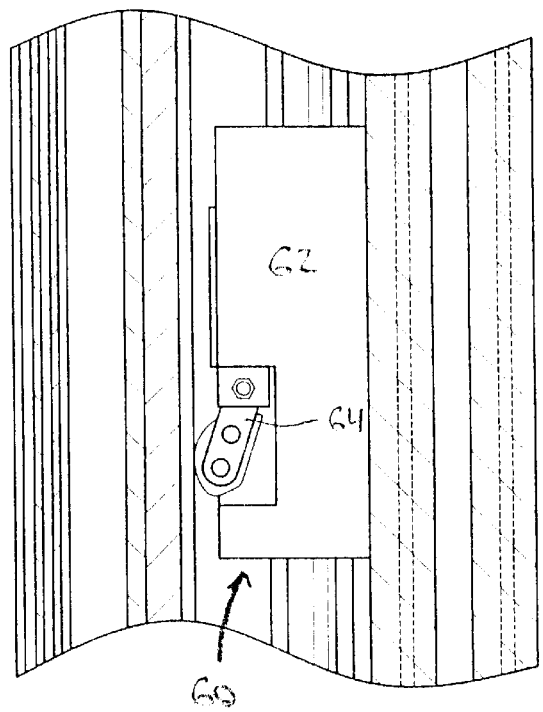
FIG. 3 is a top planar perspective view taken along line 33 of FIG. 2 showing the trolley assembly for the present invention.
Figure 5:
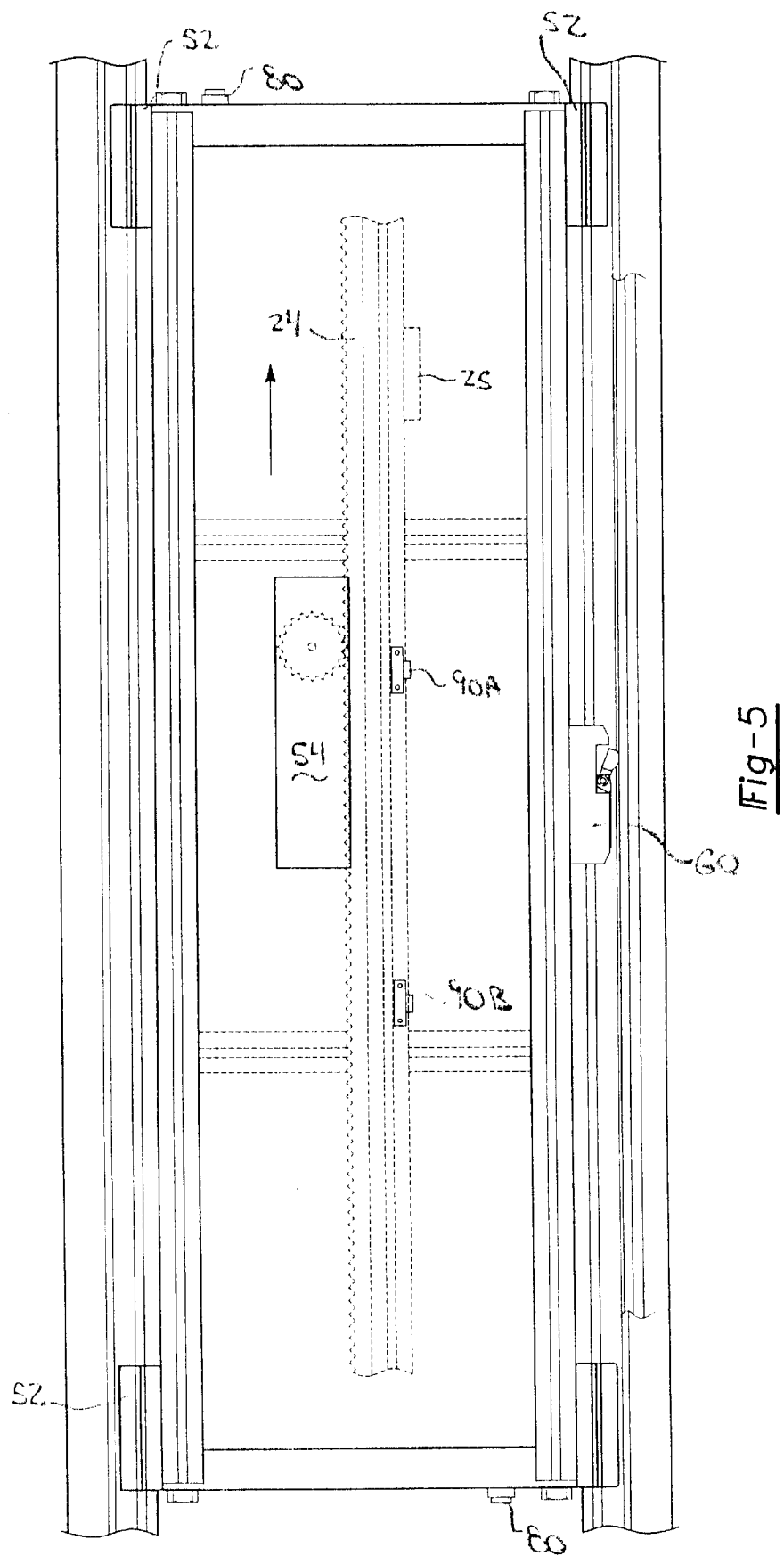
FIG. 5 is a top planar view of the pallet system of the present invention.
Figure 6:
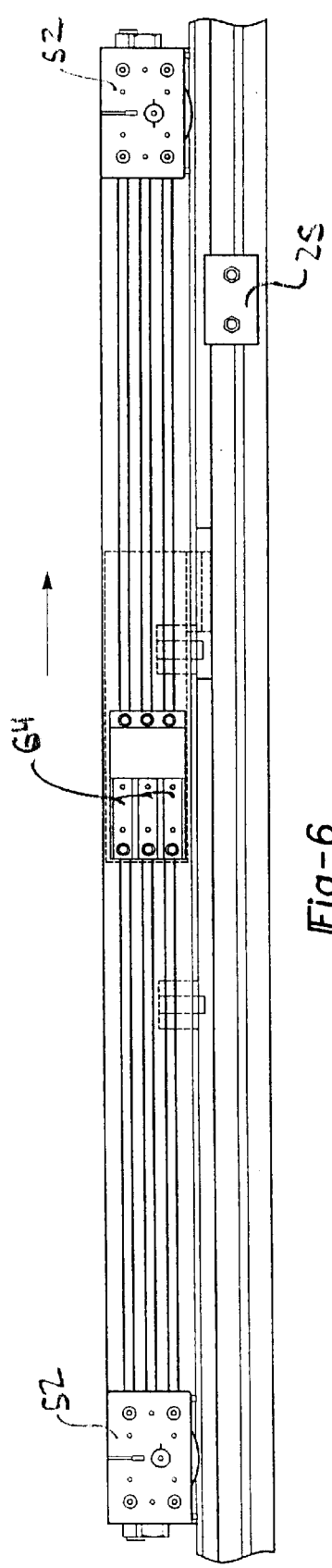
FIGS. 6 and 7 are right and left, respectively, side views of the pallet of the present invention positioned on the rails.
Figure 7:
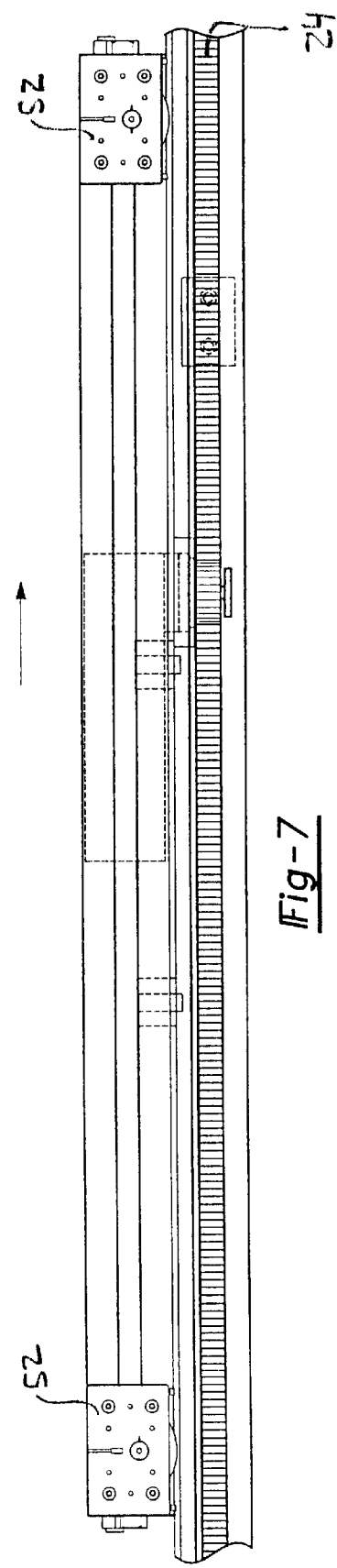

Referring now to FIGS. 3, 5 and 6, there is shown a trolley assembly 60 for use in connection with the pallet assembly 14 of the present invention. Preferably, the trolley assembly 60 includes a housing 62 having a plurality of brushes 64. As best shown in FIG. 3, the brushes 64 are biased against and contact the transmission bars 40 of the rail support 20A, 20B. Using this system, the operator may transmit power or data directly to the pallet assembly 14 (e.g., to the programmable memory of the drive system 54) at any point along the pallet conveyor system 10. Alternatively, the drive system 54 of the pallet assembly 14 may be adapted to include a radio receiver and transmitter (not shown) as a means to convey command instructions to the pallet assembly 14.

Still referring to FIGS. 3, 5 and 6, infrared sensors 80 are preferably disposed in the front and rear of the pallet assembly 14. The sensors 80 permit cueing of multiple pallet assemblies (not shown) and also serve to prevent collision of multiple pallet assemblies as they progress along the rail assembly 12.

Referring now to FIG. 4, there is shown a system for initiating braking of the pallet system. Preferably, at least two diffuse reflector sensors 90A, 90B are disposed along the base 58 of the pallet assembly 14 in axial relationship with one another and the side of the intermediate support 18 having the stop bar 25. Notably, the stop bar 25 is preferably positioned along the rail assembly 12 that the user desires the pallet to stop (e.g., at a workstation). In operation, as the pallet assembly 14 progresses down the rails 22A, 22B, the first or upstream sensor 90A will identify or detect the location bar 25 on the intermediate support 18. Upon identifying the location bar, the sensor 90A signals the pallet assembly 14 (specifically the drive system 54) to slow its progress along the rail assembly 12. Thereafter, as the second or downstream sensor 90B identifies or detects the location bar 25, the pallet assembly 14 will initiate a complete stop. Using this system, it should be appreciated that the pallet assembly 14 of the present invention can be made to precisely stop at any position along the rail assembly 12 with a high degree of accuracy and without the need to program or reprogram the pallet assembly 14.

Having described my invention, many modifications thereto will become apparent to those skilled in the art to which it pertains, without deviation from the spirit of the present invention as defined by the scope of the present invention and as defined by the scope of the appended claims.

I claim:

1. A pallet conveyor system comprising:
a rail assembly, said rail assembly comprising at least a pair of parallel and spaced apart rails, an intermediate support positioned between said rails, a rack affixed to a first side of said intermediate support and a stop bar removably affixed to a second side of said intermediate support; and
a pallet assembly, said pallet assembly comprising a body having a longitudinal extending frame and a base, a plurality of roller bearings affixed to said body that engage said rails of said rail assembly, a drive system secured to said body and adapted to engage said rack and a first sensor and second sensor secured to said body, said first and second sensors being adapted to detect said stop bar and signal said drive system to brake and then stop said pallet assembly.

2. The pallet conveyor system of claim 1, wherein said rail assembly further comprises a pair of rail supports, said each of said rail supports having a channel for securing said spaced apart rails.

3. The pallet conveyor system of claim 2, further comprising a pair of conveyor supports, said conveyor supports being affixed to and adapted to carry said rail supports.

4. The pallet conveyor system of claim 2, wherein at least one of said rail supports comprises a plurality of transmission bars.

5. The pallet conveyor system of claim 1, further comprising a first data coupler removably secured to said rail assembly and a second data coupler affixed to said body of said pallet assembly and in electrical communication with said drive system, said first and second data coupler being positioned transmit and receive data when said pallet assembly is stopped.

6. The pallet conveyor system of claim 4, wherein said pallet assembly further comprises a trolley assembly secured to said frame of said body, said trolley comprising a housing and a plurality of brushes extending from said housing, said brushes contacting said transmission bars.

7. The pallet conveyor system of claim 1, wherein said drive system of said pallet assembly comprises a servo motor, a spur gear adapted to engage said rack, a gear reducer and a voltage clamp.

8. The pallet conveyor system of claim 7, wherein said drive system further comprises a programmable memory.

9. The pallet conveyor system of claim 1, wherein said first and second sensors comprise diffused reflector sensors.

10. The pallet conveyor system of claim 9, wherein said first and second sensors are secured on said base of said pallet assembly in a spaced-apart relationship such that said first sensor detects said stop bar before said second sensor.

11. The pallet conveyor system of claim 1, wherein said pallet assembly further comprises at least one infrared sensor secured to said body of said pallet assembly and in communication with said drive system, said infrared sensor being adapted to detect the presence of a second pallet assembly downstream of said pallet assembly such that the pallet assembly remains spaced apart from said second pallet assembly.

12. The pallet conveyor system of claim 1, wherein said first and second sensors comprise diffused reflector sensors.

13. A pallet conveyor system comprising:
a rail assembly, said rail assembly comprising a pair of parallel and spaced apart rail supports, each of said rail supports having a rail disposed thereon, at least one of said rail supports having a plurality of transmission bars, an intermediate support positioned between said rails, a rack affixed to a first side of said intermediate support and a stop bar removably affixed to a second side of said intermediate support; and
a pallet assembly, said pallet assembly comprising a body having a longitudinal extending frame and a base, a plurality of roller bearing affixed to said body that engage said rails of said rail assembly, a drive system secure to said body and adapted to engage said rack, a trolley assembly secured to said frame of said body, said trolley comprising a plurality of brushes, said brushes contacting said transmission bars of said rail supports, and a first sensor and second sensor secured to said body, said first and second sensors being adapted to detect said stop bar and signal said drive system to brake and then stop said pallet assembly.

14. A pallet conveyor system comprising:
a rail assembly, said rail assembly comprising a pair of parallel and spaced apart conveyor supports, each of said conveyor supports having mounted thereon a rail support, each of said rail supports having a cylindrical rail, at least one of said rail supports having a plurality of transmission bars, an intermediate support positioned between said rails, a rack affixed to a first side of said intermediate support and a stop bar removably affixed to a second side of said intermediate support and a data coupler secured to at least one of conveyor supports; and
a pallet assembly, said pallet assembly comprising a body having a longitudinal extending frame and a base, a plurality of roller bearings affixed to said body that engage said rails of said rail assembly, a drive system secure to said body and adapted to engage said rack, a trolley assembly secured to said frame of said body, said trolley comprising a plurality of brushes, said brushes contacting said transmission bars of said rail supports, a first sensor and second sensor secured to said body, said first and second sensors being adapted to detect said stop bar and signal said drive system to brake and then stop said pallet assembly, and an infrared sensor secured to said body and in communication with said drive system and being positioned to communicate with said data coupler of said rail assembly when said pallet assembly is stopped.

* * * * *